United States Patent [19]
Elliott

[11] Patent Number: 4,812,814
[45] Date of Patent: Mar. 14, 1989

[54] INDICATING LIGHT

[75] Inventor: William Elliott, Zephyr Cove, Nev.

[73] Assignee: Magnadyne Corporation, Compton, Calif.

[21] Appl. No.: 222,141

[22] Filed: Jul. 21, 1988

[51] Int. Cl.⁴ .......................... G08B 5/00; H05B 33/00
[52] U.S. Cl. ...................... 340/332; 340/461;
340/525; 340/815.03; 340/815.2; 340/815.14;
340/815.15; 362/310; 362/226; 362/800
[58] Field of Search ........... 340/332, 52 F, 971,
340/973, 79, 525, 691, 693, 760, 762, 766, 782,
815.03, 815.15, 815.14, 815.2, 815.16; 362/226,
293, 294, 800, 249, 812, 311, 326, 307, 362

[56] References Cited
U.S. PATENT DOCUMENTS

| | | | |
|---|---|---|---|
| 3,761,920 | 9/1973 | Houbolt et al. | 340/815.14 |
| 3,934,105 | 1/1976 | Lockard | 362/800 |
| 4,025,896 | 5/1977 | Hintze et al. | |
| 4,044,708 | 8/1977 | Klein | 116/129 P |
| 4,163,428 | 8/1979 | Ishikawa | 362/29 |
| 4,215,647 | 8/1980 | Fukasawa | 362/29 |
| 4,217,625 | 8/1980 | Klein | 362/800 |
| 4,236,480 | 12/1980 | Gröhl | 362/29 |
| 4,298,869 | 11/1981 | Okuno | 362/800 |
| 4,321,655 | 3/1982 | Bouvrande | 362/29 |
| 4,431,966 | 2/1984 | Pucciarello | 362/29 |
| 4,443,835 | 4/1984 | Brautigam et al. | 362/307 |
| 4,466,050 | 8/1984 | Lockard | 362/307 |
| 4,471,414 | 9/1984 | Savage, Jr. | 362/800 |
| 4,473,870 | 9/1984 | Sorenson | 340/815.2 |
| 4,478,588 | 10/1984 | Lockard | 362/307 |

Primary Examiner—Donnie L. Crosland
Attorney, Agent, or Firm—Poms, Smith, Lande & Rose

[57] ABSTRACT

An indicating light for use in a vehicle or the like having a main housing with an LED unit mounted therein. The LED unit has at least a pair of LED lights. The contact of one of the LEDs is coupled to a contact extending out of the housing and the contact of the other LED is coupled to one lead of a resistor, the other lead being coupled to a spring clip contact having one leg mounted in the housing and the other leg extending out of the housing providing both a ground and a retaining member for the LED when mounted in a suitable aperture in the application. A lens closes off the upper portion of the housing and the light emitted from the LED unit is distributed uniformly and evenly across the entire surface of the lens without "hot spots" or areas of minimal lighting.

14 Claims, 4 Drawing Sheets

INDICATING LIGHT

BACKGROUND OF THE INVENTION

The invention relates to indicating lights; and, more particularly, to warning lights on the panel of a vehicle or the like which light up to warn or indicate a particular function.

DESCRIPTION OF THE PRIOR ART

Warning lights are used in many applications to warn the operator of a vehicle of machinery of the actuation of a particular function, such as overheating of an engine. Generally, such lights are invisible until needed, then light up warning or indicating of a particular condition.

Conventional miniature light bulb elements have been used in such lights in the past but these light bulbs have a limited light span. In recent years, conventional LED light elements have been used since such elements outlast conventional light bulbs. However, light bulb elements have long filaments which give out a lot of light. LED light elements only give out a pin point of light. Problems have been encountered in the use of such LED light elements in obtaining a flat evenly lit lens face due to the pin point lights put out by LED light elements. The use of a plurality of such LED light elements has not eliminated this problem since the prior art devices using such elements have "hot spots" across the face of the lens resulting in minimal light areas. This results in bright areas and shaded areas across the lens which is highly undesirable and does not adequately luminate the indicator desired.

There thus exists a need for an indicating light which is long lasting, operates under harsh environmental conditions such as in a vehicle or the like, and provides uniform and even lighting across the face of the light.

SUMMARY OF THE INVENTION

It is an object of this invention to provide an improved long lasting indicating light.

It is a further object of this invention to provide an identification light or lamp for use in a vehicle or the like wherein harsh environment conditions are encountered.

It is still another object of this invention to provide an indicating light which provides uniform lighting across the surface thereof without "hot spots" or areas of reduced lighting.

These and other objects are preferably accomplished by providing an indicating light for use in a vehicle or the like having a main housing with an LED unit mounted therein. The LED unit has at least a pair of LEDs. The contact of one of the LEDs is coupled to a contact extending out of the housing and the contact of the other LED is coupled to one lead of a resistor, the other lead being coupled to a spring clip contact having one leg mounted in the housing and the other leg extending out of the housing providing both a ground and a retaining member for the LED when mounted in a suitable aperture in the application. A lens closes off the upper portion of the housing and the light emitted from the LED unit is distributed uniformly and evenly across the entire surface of the lens without "hot spots" or areas of minimal lighting.

DESCRIPTION OF THE PREFERRED EMBODIMENT

Figure 1:
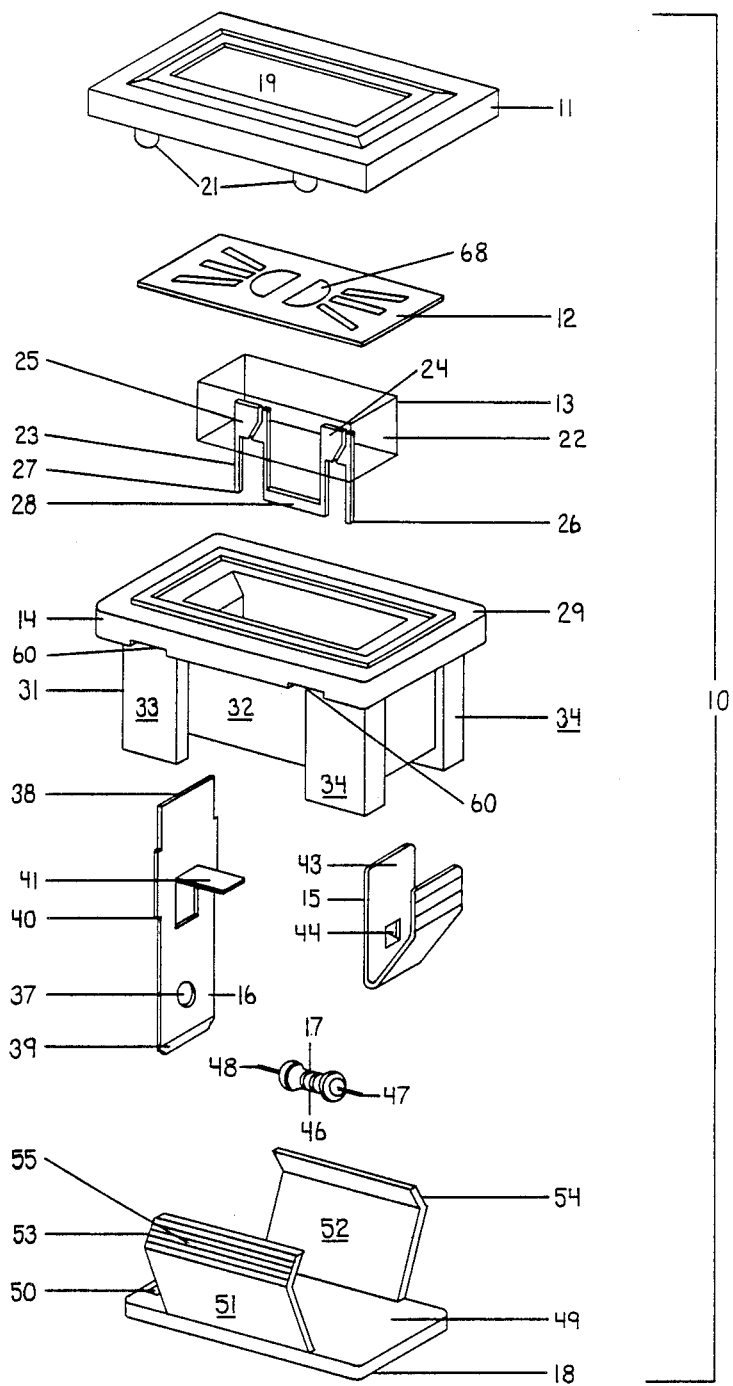
FIG. 1 is an exploded view of an indicating light in accordance with the teachings of the invention.
Figure 2:
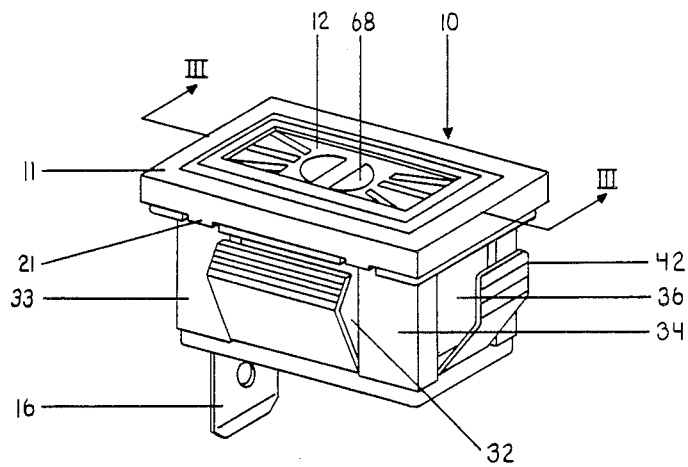
FIG. 2 is a perspective assembled view of the light of FIG. 1.

Referring now to FIG. 1 of the drawing, an indicating light assembly 10 is shown in exploded view. Assembly 10 includes a lens cover 11, a diffuser lens 12, an LED light assembly 13, a main housing 14, a pair of metallic terminals 15, 16, a resistor 17 and an end cover 18. The final assembly of the parts 11 to 18 is shown in FIG. 2.

Referring again to FIG. 1, cover 11 is generally rectangular with a rectangular open area 19, a downwardly extending peripheral flange 20 (see also FIG. 3) with spaced tabs 20 along each side (only the left side tabs 20 visible in FIG. 1).

Figure 4:
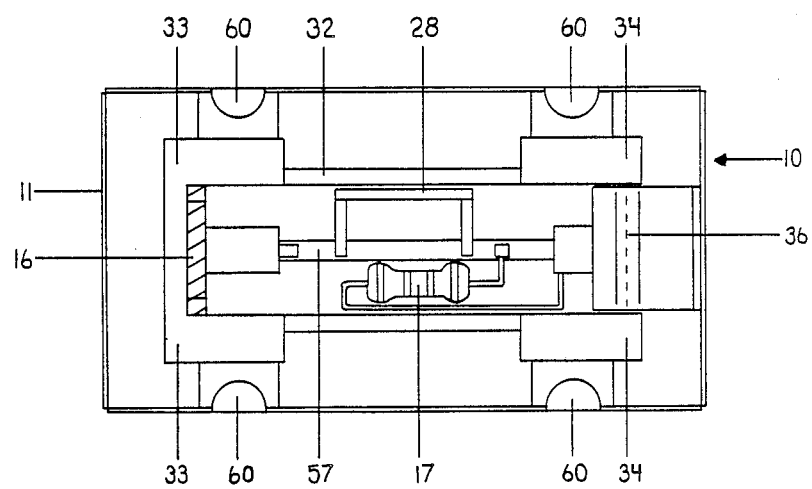
FIG. 4 is a bottom plan view of the light of FIG. 2, the end cover 18 being removed for convenience of illustration.

Lens 12 is a clear plastic lens but may be opaque or colored, if desired, depending on the application and may be a diffuser-type lens. LED light assembly 13 is a commercially available assembly, such as the rectangle type LED lamp sold by Everlite under the name 1583 Series. These lamps have a life of about 30,000 hours at 30 milliamperes and a life of about 50,000 hours at 20 milliamperes. Such an assembly 13 includes a light box 22 with an interior LED unit 23 having a pair of spaced LEDs 24, 25 each having downwardly extending spaced contacts 26, 27, respectively, and an interconnecting U-shaped flange 28. The main housing 14 includes an upper rectangular portion 29, with a central open area 30 and a lower body portion 31 comprising a midportion 32 having block portions 33, 34 (FIG. 1) on each side thereof extending downwardly from upper portion 29 (only portion 34 on the opposite side of housing 14 being visible in FIG. 1—see also FIG. 4). As seen in FIG. 4, portions 33 may be one piece interconnected by side portion 35 and portions 34 may also be one piece and interconnected by side portion 36. As seen in dotted lines in FIG. 4, and in FIG. 2, side portion 36 is set back from the outer surfaces of block portions 33, 34 for reasons to be discussed. Also, as seen in FIG. 1, midportion 32 is also set back on both sides (see also FIG. 4) from the outer surfaces of block portions 33, 34 between block portions 33, 34 for reasons to be discussed. Midportion 32 has a central open area 56 (see FIG. 3) with an elongated slot 57 along the bottom as seen in FIG. 4.

Contact 16 (FIG. 1) is an elongated metallic strip having an aperture 37 at one end and a reduced end portion 38 at the other end (portion 38, and portion 39 having aperture 37 therein may be of lesser width than integral interconnecting midportion 40). A tab or tang 41 is stamped out of midportion 40 as shown.

Contact 15 is also of metallic material being generally U-shaped in configuration thus having spaced legs 42, 43. A tab 44 is stamped out of leg 43 and leg 42 may be roughened or serrated at area 45.

Resistor 17 has a main body resistor portion 46 with outwardly extending contacts 47, 48.

Finally, end cover 18 has a generally rectangular main body portion 49 with a slot 50 therethrough at one end. Slot 50 is related to the width of end 39 of contact 16 as will be discussed. A pair of centrally mounted integral spaced flanges 51, 52 extend from main body portion 49, each flange 51, 52 being resilient and of essentially the same configuration. The terminal ends 53, 54, respectively, of each flange 51, 52 turn in slightly and are roughened or serrated on the outer surface as at surface 55 on flange 51 (surface 55 on flange 52 not visible in FIG. 1).

All parts, except where otherwise indicated, may be of unitary construction and snap fit together. Thus, any suitable plastics may be used.

Figure 3:
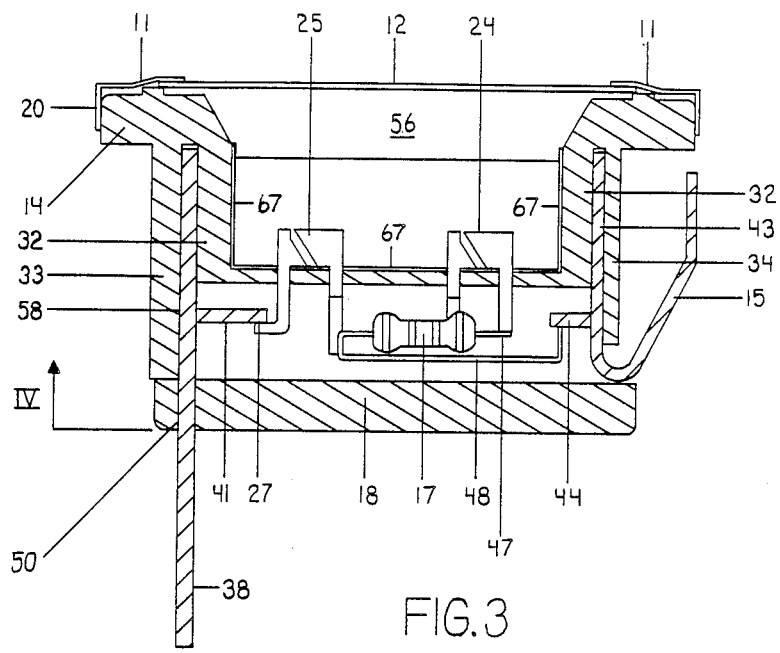
FIG. 3 is a view taken along lines III—III of FIG. 2.

In assembling assembly 10, LED light assembly 13 is inserted into midportion 32 of housing 14 with contacts 27, 26 and flange 28 extending out through slot 57. Flange 28 is bent (FIG. 4) against the inner wall of midportion 32. Contact 38 is now inserted into a space or slot 58 (FIG. 3) formed between midportion 32 and block portion 33. Tab 41 is soldered to contact 27. The arm 43 of contact 15 is inserted into a space or slot 59 (FIG. 3) formed between midportion 32 and block portion 34. As seen in FIG. 3, arm 44 of contact 15 is angled upwardly and outwardly and of a resilient metallic material. Contact 15 thus also functions as a spring clip allowing the complete assembly 10 to be inserted into a preformed opening in the application, such as an opening in the dashboard of a car, by pushing in on serrated or ribbed area 45, inserting assembly 10 into the opening until the bottom of lens cover 11 abuts against the area surrounding the opening, then allowing the spring clip or contact 15 to spring back and retain assembly 10 within the opening in the application as is well known in the art. Clip 15 also acts as a ground when it engages a suitable part of the application.

Resistor 17 is now installed by soldering contact 48 to tab 44 (FIG. 4) with contact 47 soldered to contact 26 of LED unit 23. Contact 27 of LED unit 23 is soldered to tab 41 of contact 16. See also FIG. 3.

End cover 18 is now snap fit over the exposed bottom of subhousing 32 with end portion 39 of contact 16 extending through slot 50 therein as seen in FIG. 3. The resilient tabs or flanges 51, 52 snap into the side areas of subhousing 37 as seen in FIG. 2. Lens 12 is now placed on top of main housing 14 and lens cover 11 snapped into position. As seen in FIG. 1, tabs 12 on the cover 11 snap fit into notches 60 (FIG. 1) on both sides of main housing portion 29 (see also FIG. 4) to retain the same. The final assembled device is shown in FIG. 2. A suitable wire or conduit (not shown) in the application may be coupled to end portion 39 of contact 16 to provide power to assembly 10.

Figure 5:
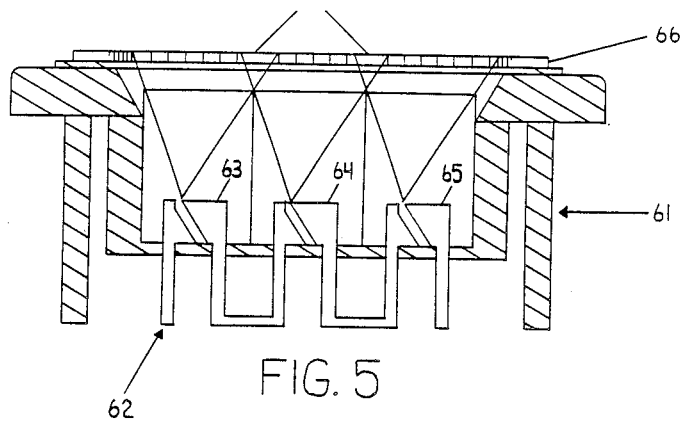
FIG. 5 is a cross-section view, partly schematic, of a Prior Art indicating light.

A convention prior art LED light assembly 61 is schematically shown in FIG. 5 (operative parts eliminated for convenience of illustration) having an LED unit 62 with three LED lights 63 to 65. As schematically illustrated, each light 63 to 65 emits rays to lens 66. These rays criss cross and form "hot spots" at areas 67 and 68. Thus, the light output at lens 66 is uneven and these "hot spot" areas are shaded areas of minimal light with respect to the remainder of lens 66.

As seen in FIG. 3, the interior surfaces of subhousing 32 may optionally be coated with a white plastic material 67. As will be discussed, this plastic coating provides a reflection of the light emitted by the LEDs 24, 25.

Figure 6:
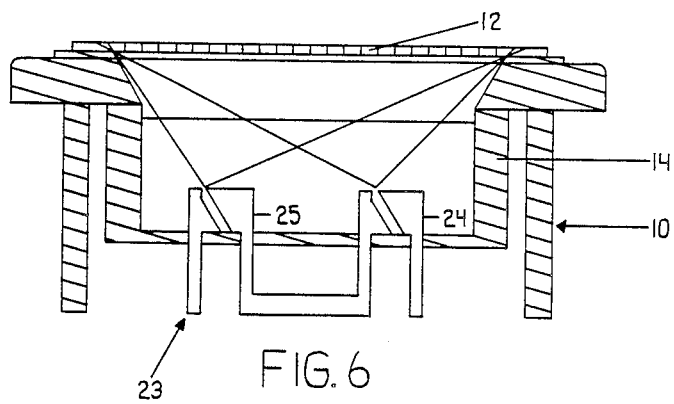
FIG. 6 is a cross-sectional view, partly schematic, of the light of FIGS. 1 to 4, the internal coating 67 being eliminated.
Figure 7:
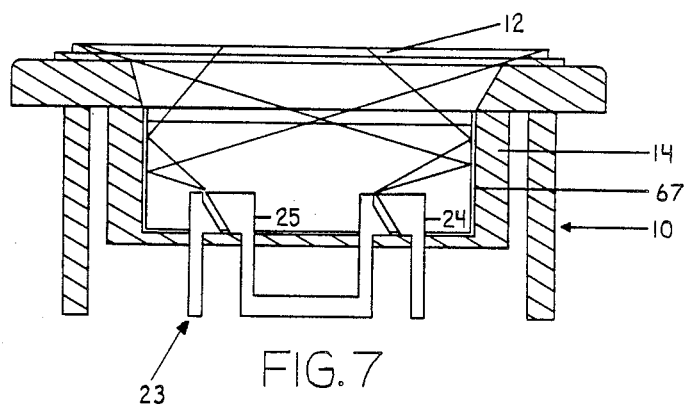
FIG. 7 is a cross-sectional view, partly schematic, of the light of FIGS. 1 to 4 illustrating the same with the internal coating 67.

Assembly 10 of FIGS. 1 to 4 is shown schematically in FIG. 6 where again operative parts thereof are omitted for convenience of illustration. In FIG. 7, plastic coating material 67 has been eliminated. As seen, the rays from LEDs 24, 25 cross cross in a manner eliminating any "hot spots" thus providing a uniformly lighted area all across lens 12. There are no minimal light areas since there are no "hot spots".

In FIG. 7, the white plastic material 67 has been added as heretofore discussed. It can be seen that the rays from LEDs 24, 25 bounce off of the white plastic coated side of the interior of subhousing 32 again uniformly covering lens 12 eliminating "hot spots" and thus any minimal light areas.

Lens 12 can be any suitable color, such as yellow or amber, and merely diffuses the light emitted from the LEDs. The box 22 is preferably of a resin material, such as amber, and is generally slightly tinged or colored, such as a greenish tint which enhances the color of the LEDs. The greenish tint is preferred since it is more efficient than clear and the LED lights emit more light in the yellow spectrum. As seen in FIG. 1, assuming lens diffusor 12 is yellow, white areas outlined by suitable indicia 68 may be provided in lens 12. When assembly 10 is lit, the light comes through the outlines areas of indicia 68 thereby outlining the function of assembly 10. When unlit, the outlined area is invisible to the naked eye. Thus, assembly 10 may be used as a warning indicator lighting up suitable warning indicia when needed. Main housing 14 may be made of any suitable material, such as high impact polystyrene. The reflective coating of plastic material 67 may be the same high impact polystyrene but white in color (whereas housing 14 may be of black material).

Any suitable resistor can be used, such as 330 to 470 ohm resistors. A resistor of 390 ohms is preferred.

It can be seen that there is discussed a unique and novel indicating light which is long lasting, can operate under harsh conditions and disperses light uniformly and evenly across the diffuser lens of the light without "hot spots" or areas of lessened light with respect to the remainder of the lens.

I claim:

1. An indicating light comprising:
    a main housing having a top and bottom portion with an internal cavity in the bottom portion with an opening along the bottom of said cavity;
    an LED unit having a box with a plurality of spaced LEDs therein mounted in said cavity, each of said LEDs having a contact extending out through said opening and below said cavity, each of said LEDs being interconnected by an electrically conductive element, said element also extending out through said opening below said cavity;
    an elongated metallic contact mounted in said housing and extending away from the bottom portion thereof electrically connected to the contact of one of said LEDs;
    a generally U-shaped metallic contact mounted in said housing having one leg electrically connected to one lead of a resistor mounted in the bottom portion of said housing below said cavity and the other leg extending out of said housing providing a ground for said light, said resistor having a second lead electrically connected to the contact of the other of said LEDs; and a lens mounted in the top portion of said housing closing off the upper open end of said cavity.

2. In the light of claim 1 wherein the interior of said cavity is coated with a white plastic material.

3. In the light of claim 1 wherein said box is a hardened opaque resin material.

4. In the light of claim 3 wherein said resin material is tinted green.

5. In the light of claim 1 wherein said lens is tinted yellow.

6. In the light of claim 1 wherein indicia is provided in said lens differently contrasted from the remainder of said lens.

7. In the light of claim 6 wherein said lens is tinted yellow and said indicia is white.

8. In the lens of claim 1 wherein said resistor has a value between 330 to 470 ohms.

9. In the lens of claim 8 wherein said resistor has a value of 390 ohms.

10. In the light of claim 1 wherein said conductive element is bent against the inside of the bottom portion of said housing below said opening.

11. In the light of claim 1 wherein two LED lights are provided.

12. In the light of claim 1 wherein said U-shaped metallic contact is a spring clip having resilient means for biasing said light in position when inserted into an opening in an application.

13. In the light of claim 1 including an end cover snap fitting onto the bottom portion of said housing closing off the same, said elongated contact extending through a slot in said end cover and away therefrom.

14. In the light of claim 1 wherein said lens is a diffuser lens.

* * * * *